US011873786B2

(12) United States Patent
Hornby et al.

(10) Patent No.: US 11,873,786 B2
(45) Date of Patent: Jan. 16, 2024

(54) AXISYMMETRIC INJECTOR HOLD-DOWN LOAD RING

(71) Applicant: Stanadyne LLC, Jacksonville, NC (US)

(72) Inventors: Michael Hornby, Emerald Isle, NC (US); James Bennardi, Whitmore Lake, MI (US)

(73) Assignee: Stanadyne Operating Company LLC, Jacksonville, NC (US)

(*) Notice: Subject to any disclaimer, the term of this patent is extended or adjusted under 35 U.S.C. 154(b) by 0 days.

(21) Appl. No.: 17/969,229

(22) Filed: Oct. 19, 2022

(65) Prior Publication Data

US 2023/0118234 A1 Apr. 20, 2023

Related U.S. Application Data

(60) Provisional application No. 63/257,161, filed on Oct. 19, 2021.

(51) Int. Cl.
*F02M 61/14* (2006.01)

(52) U.S. Cl.
CPC ....... *F02M 61/14* (2013.01); *F02M 2200/856* (2013.01); *F02M 2200/857* (2013.01)

(58) Field of Classification Search
CPC ............................... F02M 61/14; F16L 23/036
USPC .......................................................... 123/470
See application file for complete search history.

(56) References Cited

U.S. PATENT DOCUMENTS 1,929,009 A * 10/1933 Williams .................. F16D 3/84 403/138
4,984,548 A * 1/1991 Hudson, Jr. .......... F02M 69/465 123/468
5,697,345 A * 12/1997 Genter ................... F02M 61/14 123/470
5,706,787 A * 1/1998 Fujikawa ........... F02M 51/0678 123/456
5,709,516 A * 1/1998 Peterson ............... F01D 25/243 267/162
5,901,688 A * 5/1999 Balsdon ............. F02M 25/0836 123/470

(Continued)

OTHER PUBLICATIONS

PCT International Search Report and Written Opinion for International Application No. PCT/US2022/047143 filed Oct. 19, 2022; dated Jan. 26, 2023; 12 pgs.

*Primary Examiner* — Sizo B Vilakazi
*Assistant Examiner* — Brian R Kirby
(74) *Attorney, Agent, or Firm* — Alix, Yale & Ristas, LLP

(57) ABSTRACT

An axisymmetric injector hold-down load ring includes an annular body and an odd numbered plurality of resilient arms integrally extending from the annular body. Each resilient arm has a curvature concentric with the annular body and extends in a first circumferential direction along an outer periphery of the annular body an equal circumferential distance from a connection with the annular body to a free end. The free end of each resilient arm includes a contact surface facing axially opposite a first surface of the annular body, the contact surface of each resilient arm is axially offset from the first surface of the annular body an equal axial distance. This configuration positions the connections and contact surfaces in radial alignment so that force is transmitted along the resilient arms between the circumferentially spaced connections and contact surfaces when the load ring is in use.

9 Claims, 6 Drawing Sheets

(56) References Cited

U.S. PATENT DOCUMENTS 5,970,953 A * 10/1999 Lorraine ................ F02M 61/14
123/456
6,019,089 A 2/2000 Taylor et al.
6,148,797 A * 11/2000 Gmelin ................ F02M 61/168
123/456
6,276,339 B1 * 8/2001 Shebert, Jr. .......... F02M 69/465
123/470
6,314,943 B1 * 11/2001 Burch .................. F02M 69/465
123/456
6,640,784 B1 * 11/2003 Sims, Jr. .............. F02M 69/045
123/456
6,684,861 B2 * 2/2004 Reiter .................. F02M 69/465
123/456
6,718,949 B2 * 4/2004 Gmelin .................. F02M 61/14
123/470
6,845,758 B2 * 1/2005 Seymour, II ............ F02F 1/242
123/470
6,846,023 B2 * 1/2005 Ebinger .............. F16L 37/1225
285/305
7,373,926 B2 * 5/2008 Eckbauer ............... F02M 69/46
123/470
7,600,502 B2 * 10/2009 Welzmueller ........ F02M 61/167
123/470
7,934,488 B2 * 5/2011 Biasci .................. F02M 69/465
123/470
9,032,934 B2 * 5/2015 Nakamura ............. F02M 69/04
123/456
9,109,563 B2 * 8/2015 Roseborsky ........... F02M 61/14
9,347,411 B2 * 5/2016 Friedrich ............... F02M 61/14
9,435,303 B2 9/2016 Yasuda et al.
9,546,627 B2 1/2017 Okamoto et al.
9,938,948 B2 * 4/2018 Serra .................... F02M 61/145
10,125,733 B1 * 11/2018 Mizuba .................. F02M 61/14
10,648,439 B2 5/2020 Pohlmann et al.
11,255,307 B2 * 2/2022 Kromer .................. F02M 61/14
11,459,989 B2 * 10/2022 Oh ............................ F16B 2/22
2002/0084562 A1 * 7/2002 Kelsey .................... F16F 1/326
267/166
2002/0100456 A1 * 8/2002 Panasuk ............... F02M 55/004
123/456
2006/0118091 A1 6/2006 Zdroik
2006/0124110 A1 6/2006 Schoeffler
2008/0302336 A1 * 12/2008 Fuerst .................... F02M 61/14
123/470
2009/0288435 A1 * 11/2009 Lu ......................... F16K 15/046
62/222
2010/0258085 A1 * 10/2010 Giorgetti ................ F02M 55/02
123/470
2011/0030656 A1 * 2/2011 Pepperine ............. F02M 61/14
123/470
2011/0265767 A1 * 11/2011 Xu ....................... F02M 53/046
123/470
2012/0104120 A1 * 5/2012 Holt ........................ F16F 1/328
239/533.2
2012/0247426 A1 * 10/2012 Roseborsky ........... F02M 61/14
123/470
2014/0123926 A1 * 5/2014 Inomata ................. F02M 61/12
123/188.4
2014/0231551 A1 * 8/2014 Serra ...................... F02M 61/14
239/584
2017/0096977 A1 4/2017 Di Domizio et al.
2017/0350358 A1 * 12/2017 Bayer .................... F02M 61/14
2017/0356413 A1 * 12/2017 Oh ......................... F02M 61/14
2019/0136812 A1 5/2019 Rehwald et al.

* cited by examiner

AXISYMMETRIC INJECTOR HOLD-DOWN LOAD RING

BACKGROUND

The present disclosure relates in general to fuel injectors and more specifically to a fuel injection assembly that includes a support structure for securing a fuel injector in an injection valve mounting hole in an internal combustion engine.

Fuel injection assemblies are in widespread use for delivering fuel from a fuel reservoir, such as a fuel rail, to an internal combustion engine. In a direct injection (DI) system, the cylinder head of the engine defines an injection valve mounting hole that receives a nozzle end of the fuel injector so that the tip of the fuel injector is positioned in the combustion chamber of an engine cylinder.

A typical fuel injection system includes a common rail defining a reservoir of fuel pressurized by a high-pressure fuel pump. The common rail includes outlet connections for communicating high pressure fuel to fuel injectors positioned to deliver fuel into the combustion chamber of each cylinder of an internal combustion engine. Each fuel injector is positioned in a recess or bore in the cylinder head, with a tip of the fuel injector arranged to release pressurized fuel through fuel injection orifices in the tip of the injector into the combustion chamber. The fuel injector typically incorporates a solenoid operated valve that is operated by an engine control unit (ECU) to allow pressurized fuel to pass through the injector in coordination with movement of the piston associated with the combustion chamber. The injector may be positioned between the cylinder head and the common rail, with the common rail defining a socket or connection for communicating high pressure fuel from the rail into an inlet of the fuel injector. It is known to arrange a resilient clip between the fuel rail and the fuel injector so that when the rail is mounted to the engine, the clip exerts a resilient hold down force on the fuel injector.

In some cases, the resilient clip has a shape that results in hold down forces that are not evenly distributed about a longitudinal axis of the fuel injector. Some resilient clips have a pair of contacts between the clip and the surrounding structure that can result in tilting or pivoting of the injector about an axis passing through the pair of contacts. This can result in angulation of the tip of the fuel injector within the cylinder head, which alters the intended position of the tip of the fuel injector and its fuel injection orifices relative to the combustion chamber. The tip of each fuel injector includes an annular seal to contain pressurized gasses in the combustion chamber. Repeated movement of the injector tip in its bore can result in wear on the annular seal and ultimately lead to failure of the seal.

There is a need for a simple and economical resilient element for use in a fuel injection assembly that produces axisymmetric forces on the fuel injector.

SUMMARY OF THE INVENTION

The disclosed load ring is used in a support structure for a fuel injector in which a nozzle part of the fuel injector is arranged in an injector mounting hole that positions a nozzle tip of the fuel injector in the combustion chamber of an internal combustion engine. A common rail supported on the engine includes an outlet to deliver pressurized fuel from the common rail to the fuel injector. A disclosed fuel injector uses an electromagnetic fuel injection valve to control injection of fuel into an internal combustion engine. The body of the fuel injector is a metal fuel tube that contains the fuel handling components of the valve and defines a fuel flow path from an inlet to a tip of the fuel injector that may project into an engine cylinder. A valve member is coupled to an axially extending needle and armature of a solenoid that opens the valve under control of an engine control system. The solenoid includes a pole fixed within the injector body, an armature coupled to the valve needle and a coil surrounding the injector body where the coil generates magnetic flux through the pole and armature to attract the armature to the pole and open the valve. The injector assembly includes a power group assembly which comprises a lower flux washer, a cylindrical housing, and a slotted upper flux washer that collectively surround the coil of the solenoid and complete a magnetic flux circuit for the solenoid. The lower flux washer, cylindrical housing and upper flux washer are secured to the injector body and to each other by welding. The fuel injector includes a forward end supported on the engine and a load-receiving surface facing the outlet of the common rail. The load ring is positioned between the load-receiving rear end of the fuel injector and the outlet of the common rail to bias the fuel injector toward the engine and maintain the injector nozzle tip in a predetermined position.

According to aspects of the disclosure, the load ring includes an annular body having a first surface facing either the outlet of the common rail or the load-receiving rear end of the fuel injector. The load ring has a plurality of resilient arms connected to the annular body, each resilient arm including an integral connection projecting radially from the annular body and a resilient portion extending from the attachment portion to a free end. Each resilient arm extending along the circumference of the annular body an equal circumferential distance from the connection to the free end. The free end of each resilient arm including a contact surface facing axially opposite a first surface of the annular body, the contact surface of each resilient arm being axially offset from the first surface of the annular body an equal axial distance. The connections of each resilient arm and the contact surfaces of each resilient arm are positioned radially outward of the annular body of the load ring an equal radial distance. This configuration positions the connections and contact surfaces in radial alignment so that force is transmitted along the resilient arms between the circumferentially spaced connections and contact surfaces when the load ring is in use. Configuring the disclosed load ring with an odd numbered plurality of resilient arms prevents diametrically aligned force paths that can result in off-axis movement of a fuel injector in response to forces generated during operation of an internal combustion engine.

The load ring is compressed between an outlet of the common rail and a load-receiving surface of the fuel injector to bias the fuel injector into the injector mounting hole. The load ring is configured to generate a bias force that is symmetrical with a longitudinal axis of the fuel injector. In some embodiments the load ring comprises three resilient arms. In some embodiments the contact surface of each arm is positioned on a circle concentric with the annular body and is spaced apart from the other contact portions by an equal angle measured along a circumference of the annular body. In some embodiments the load ring includes a stress-relieving aperture between an inner edge of each resilient arm and an outer periphery of the annular body where the resilient arm connects to the annular body. The load ring may be constructed from a unitary piece of resilient steel. In some embodiments, the first surface of the annular body is planar and coincident with a first plane including the connections, and the contact surfaces of each resilient arm are coincident with a second plane axially offset from and parallel to the first plane. The load ring is axially reversible and may be installed with the first surface of the annular body facing the outlet of the common rail and the contact surfaces of each resilient arm radially outward of the annular body and facing the load-receiving surface of the fuel injector.

A fuel injector assembly is also disclosed. The fuel injector assembly includes an inlet with a first end defining an opening for receiving fuel from a common rail and a second end having a cylindrical outside surface, said opening extending through the second end of the inlet. A valve body includes an open first end having a cylindrical side wall including an inside surface receiving the second end of the inlet, the inlet second end axially overlapping with the cylindrical side wall of the valve body to form a joint, said valve body including a nozzle end opposite said first end. In a disclosed embodiment, the fuel injector includes a burst ring having a cylindrical body surrounding the joint between the inlet and the valve body. A first end of the cylindrical body is seated against a radially projecting shoulder rigidly connected to the valve body and a second end of the burst ring defines a load-receiving surface of the fuel injector facing the inlet first end. The joint between the inlet and valve body is positioned axially between the first and second ends of the cylindrical body of the burst ring.

The fuel injector assembly is configured for delivery to a manufacturer and includes seals, a spacer, and a load ring on the fuel injector. The load ring has an annular body with a first inside diameter surrounding the cylindrical outside surface of the inlet. An O-ring seal is seated in an annular groove surrounding the first end of the inlet to form part of a seal with the outlet of the common rail. When positioned in the groove on the inlet, the O-ring has an outside diameter greater than the inside diameter of the load ring, so that the load ring cannot pass over the first end of the inlet when the O-ring. The load ring is retained in position surrounding the inlet of the fuel injector by the O-ring during shipping of the fuel injector assembly. The injector assembly also includes an annular spacer surrounding a forward end of the fuel injector to support the fuel injector on the engine and position the nozzle tip of the fuel injector in a predetermined position relative to the combustion chamber. Different spacers can be used for different engine configurations. According to aspects of the disclosure, a retaining clip having a radially projecting flange faces the annular spacer and a plurality of inward oriented fingers from the retaining clip engage in a groove on the valve body so that the retaining clip retains the annular spacer in position on valve body during shipping of the injector assembly. The injector assembly includes all the parts needed for installation when the injector assembly is removed from its packaging and the injector assembly is configured to retain all the parts to the injector during shipment.

An injector hold down ring load ring is also disclosed. The load ring has an annular body with a first surface and an axially opposed second surface, the annular body surrounding a longitudinal axis, with the first and second surfaces perpendicular to the axis. The load ring has an odd numbered plurality of resilient arms connected to the annular body, each resilient arm including a connection integrally projecting radially from the annular body, a resilient portion extending in a first circumferential direction from the connection to a free end including a contact surface facing axially away from the first surface of the annular body. Each resilient arm extends along an outer periphery of the annular body an equal circumferential distance from the connection to the free end, and the contact surface of each resilient arm being axially offset from the first surface of the annular body by an equal axial distance. The load ring generates a bias force opposing compression of the connections toward the contact surfaces of the load ring, the bias force being symmetrical with the longitudinal axis.

The resilient steel material and dimensions of the load ring are selected to generate a bias force of approximately 60 Newtons when the contact surfaces are deflected toward the connections approximately 0.3 mm to 0.6 mm. Each resilient arm has a curvature concentric with the annular body, which positions the contact surfaces of the arms on a circle radially aligned with a circle including the connections. In some embodiments, the disclosed load ring includes a relief aperture at a junction of an inside edge of each resilient arm and the outer periphery of the annular body. In some embodiments, the load ring has a free height from the first surface of the annular body to the contact surfaces of the resilient arms of between 2 mm and 4 mm and said contact surfaces are deflected toward said connections a distance of between 10% and 20% of said free height by a force of approximately 60 Newtons. In some embodiments, each of the resilient portion has a compound "S" shaped curvature along its length, with a convex surface where the resilient arm approaches the contact surface and connection. In a disclosed embodiment, the annular body has a first radial width and the resilient arms have a second radial width, said first radial width between 0.5 and 0.8 times the second radial width.

DETAILED DESCRIPTION

Figure 1:
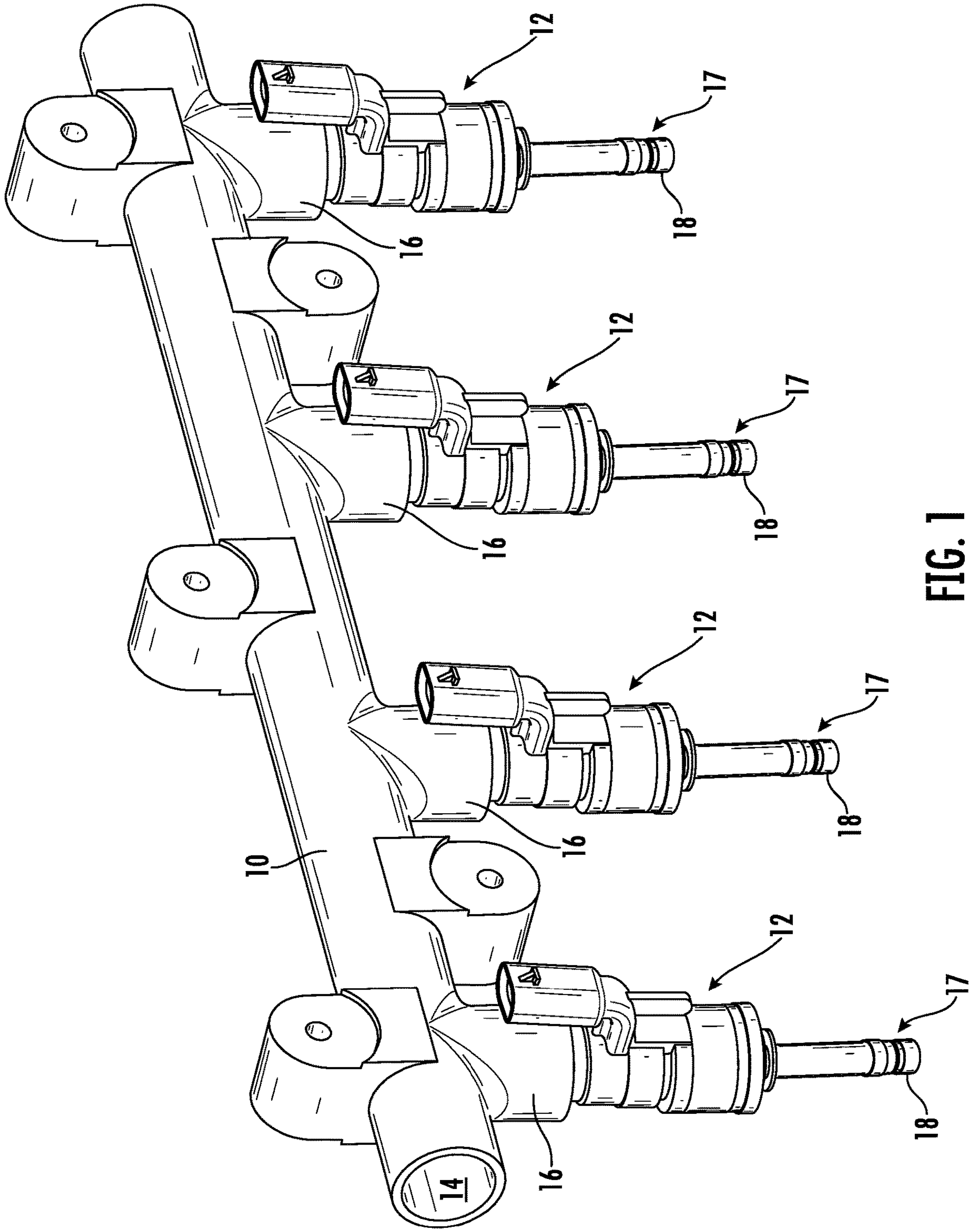
FIG. 1 is a perspective view of a fuel injection common rail and fuel injectors for mounting to a cylinder head of an internal combustion engine according to aspects of the disclosure.

FIG. 1 illustrates a representative common rail 10 and fuel injectors 12 for a direct injection system. The common rail 10 provides a reservoir 14 for fuel pressurized by a high-pressure fuel pump (not shown) and defines outlets 16 that communicate the pressurized fuel to an inlet of each fuel injector 12. While the illustrated common rail 10 includes four outlets 16 communicating with four fuel injectors 12, the number of fuel injectors can vary depending upon the number of cylinders in the internal combustion engine. Each fuel injector 12 includes a nozzle end 17 extending to a tip 18 that defines fuel injection orifices. Each fuel injector 12 incorporates a solenoid operated valve, operation of which is controlled by an engine control unit (ECU not shown) to deliver defined quantities of pressurized fuel through the injection orifices into each engine cylinder coordinated with the timing of the engine as is known in the art. The nozzle end 17 of the fuel injector 12 extends through a bore defined in the cylinder head (not shown) to position the tip 18 and injection orifices on the tip 18 in the combustion chamber of an engine cylinder. The fuel injector 12 is exposed to pressure changes in the combustion chamber, forces generated by operation of the injector solenoid valve, forces generated by each injection event and vibration generally present in an internal combustion engine. The disclosed support structure for a fuel injector is configured to maintain the tip 18 of the fuel injector 12 in a pre-determined axial and rotational position in the combustion chamber of an engine cylinder. According to aspects of the disclosure, a resilient load ring is arranged between the outlet 16 of the common rail 10 and a load bearing surface of the fuel injector 12 to bias the fuel injector toward the cylinder head and maintain the tip 18 of the fuel injector in a pre-determined position relative to the combustion chamber of each engine cylinder.

Figure 2:
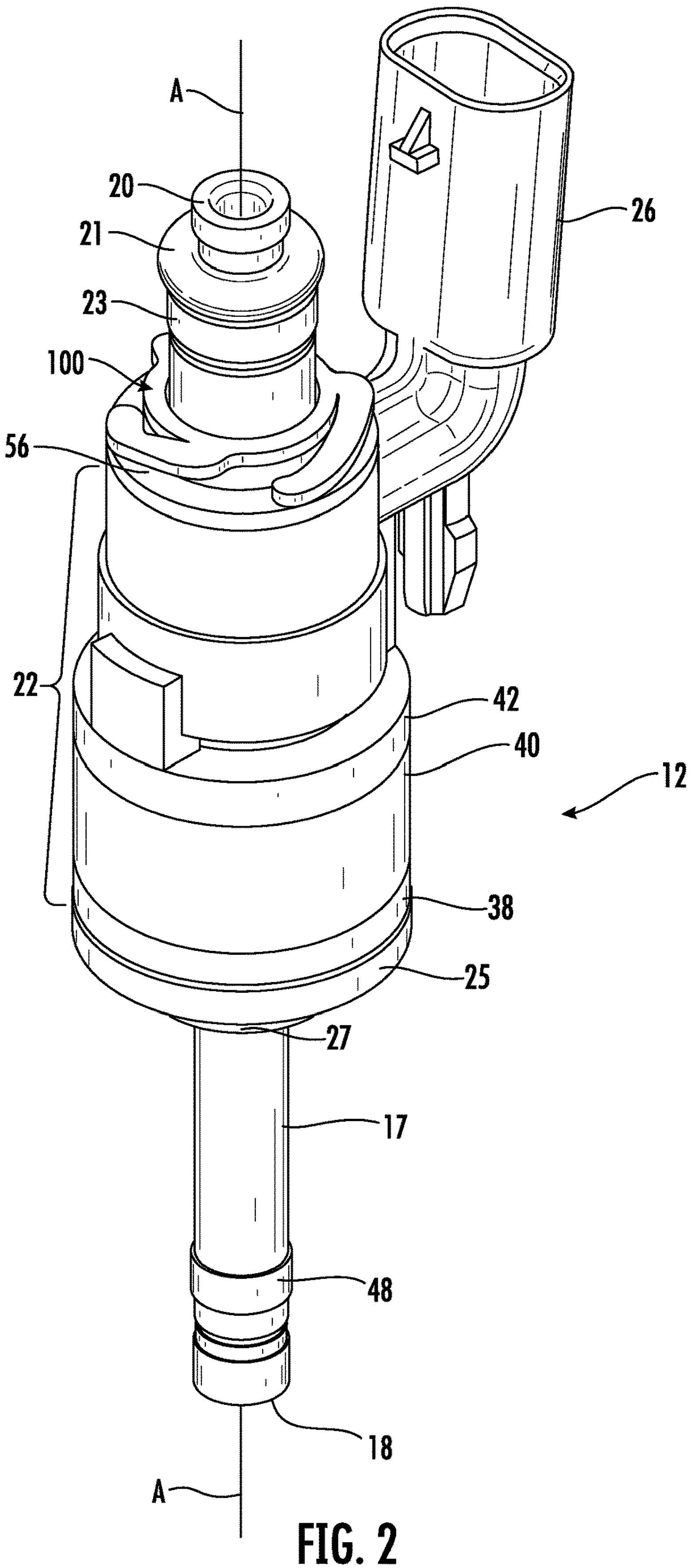
FIG. 2 is a perspective view of a fuel injector configured for use with the disclosed load ring and common rail according to aspects of the disclosure.
Figure 3:
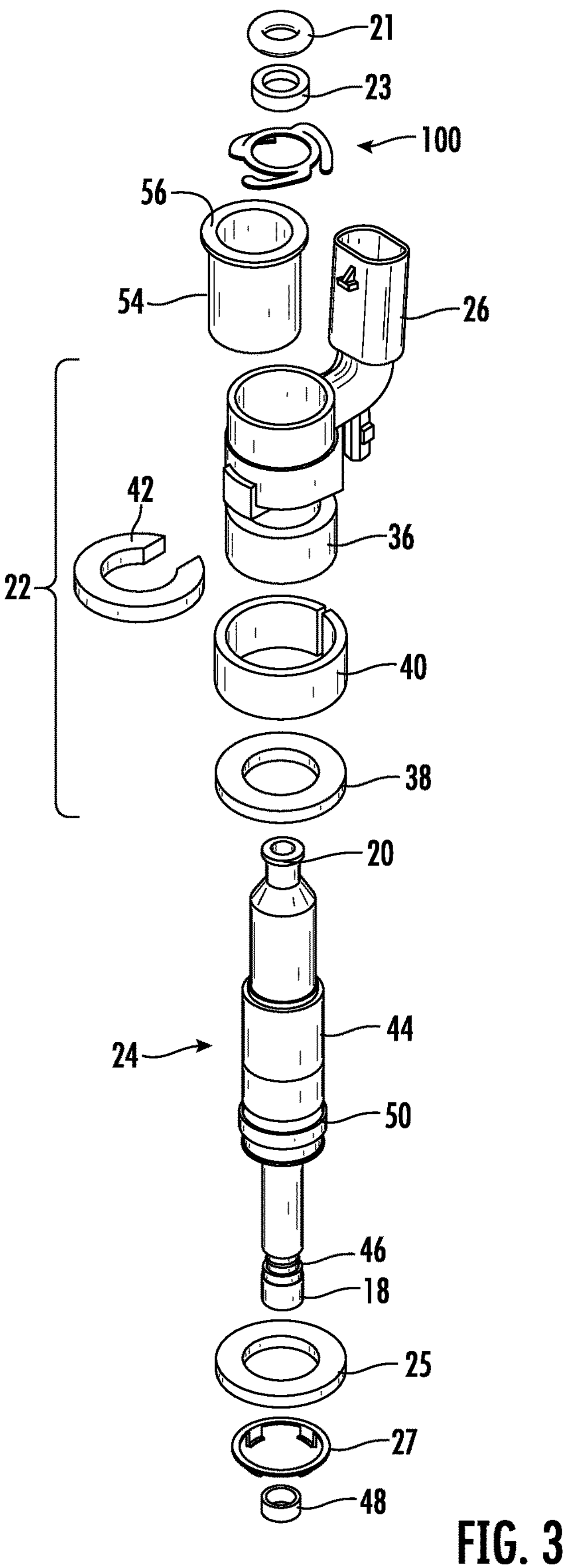
FIG. 3 is an exploded perspective view of a fuel injector according to aspects of the disclosure.

As shown in FIGS. 2-5, each fuel injector 12 extends along a longitudinal axis A-A between an inlet 20 and the tip 18 and includes a fuel tube assembly 22 and a power group assembly 24. The fuel tube assembly 24 contains the "wet" part of the fuel injector 12 that performs fluid handling functions, e.g., defining a fuel flow path from the inlet 20 to the tip 18 and allowing or prohibiting flow of fuel from the fuel injection orifices. The power group assembly 22 includes components of a solenoid that convert electrical signals delivered to an electrical connector 26 to a driving force used to open a valve contained in the fuel tube assembly 24 during an injection event. The solenoid includes components of the power group assembly 22 mounted outside the fuel tube assembly 24 and a magnetic pole 28 and armature 30 within the fuel tube assembly 24. The armature 30 is connected to a valve needle 32 and moves a valve member 34 away from a valve seat defined by an inside surface of the injector tip 18. As best seen in FIG. 3, the power group assembly 22 includes an annular coil 36 embedded in molded plastic and including conductors 52 extending to the connector 26. The connector 26 electrically connects the coil 36 to a control system (not shown) that applies power to the coil 36 to generate magnetic force applied to the armature 30, attracting the armature 30 to the fixed magnetic pole to move the armature 30, valve needle 32 and valve member 34 to permit fuel flow through the injector 10 during an injection event. The power group assembly 22 also includes a lower flux washer 38, a cylindrical housing 40, and a slotted upper flux washer 42 which, together with magnetic portions of the fuel tube assembly 24, the magnetic pole 28 and armature 30, complete a magnetic circuit of the solenoid. The basic configuration and operation of a solenoid actuated fuel injector is well-understood, and the following disclosure is intended to provide context for the disclosed support structure and load ring. The disclosed load ring 100 is can be used with any fuel injector configured with a load-bearing structure compatible with the load ring 100 as described below.

Figure 4:
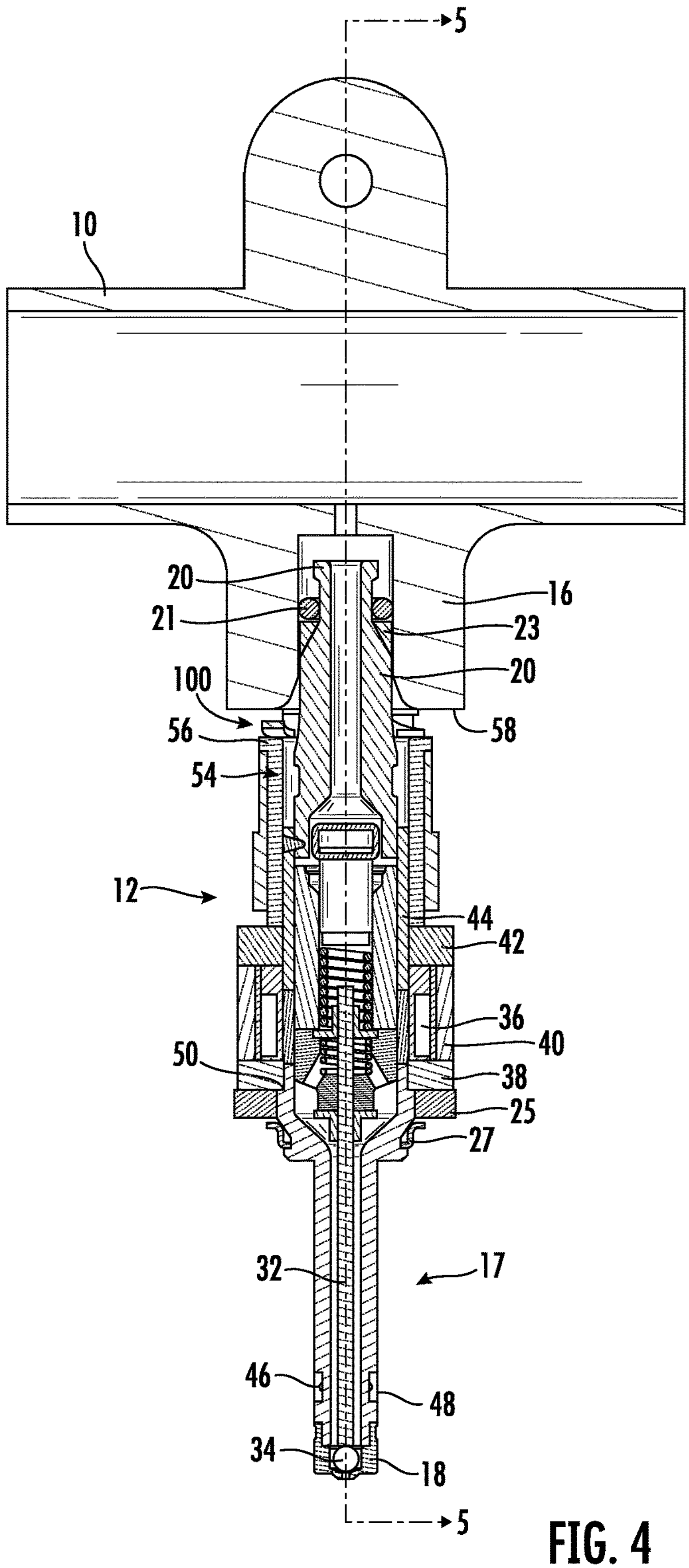
FIG. 4 is a sectional view through an outlet socket on the common rail and the fuel injector of FIG. 2 taken along a plane parallel with a longitudinal axis of the common rail, showing a load ring arranged between the common rail and injector according to aspects of the disclosure.
Figure 5:
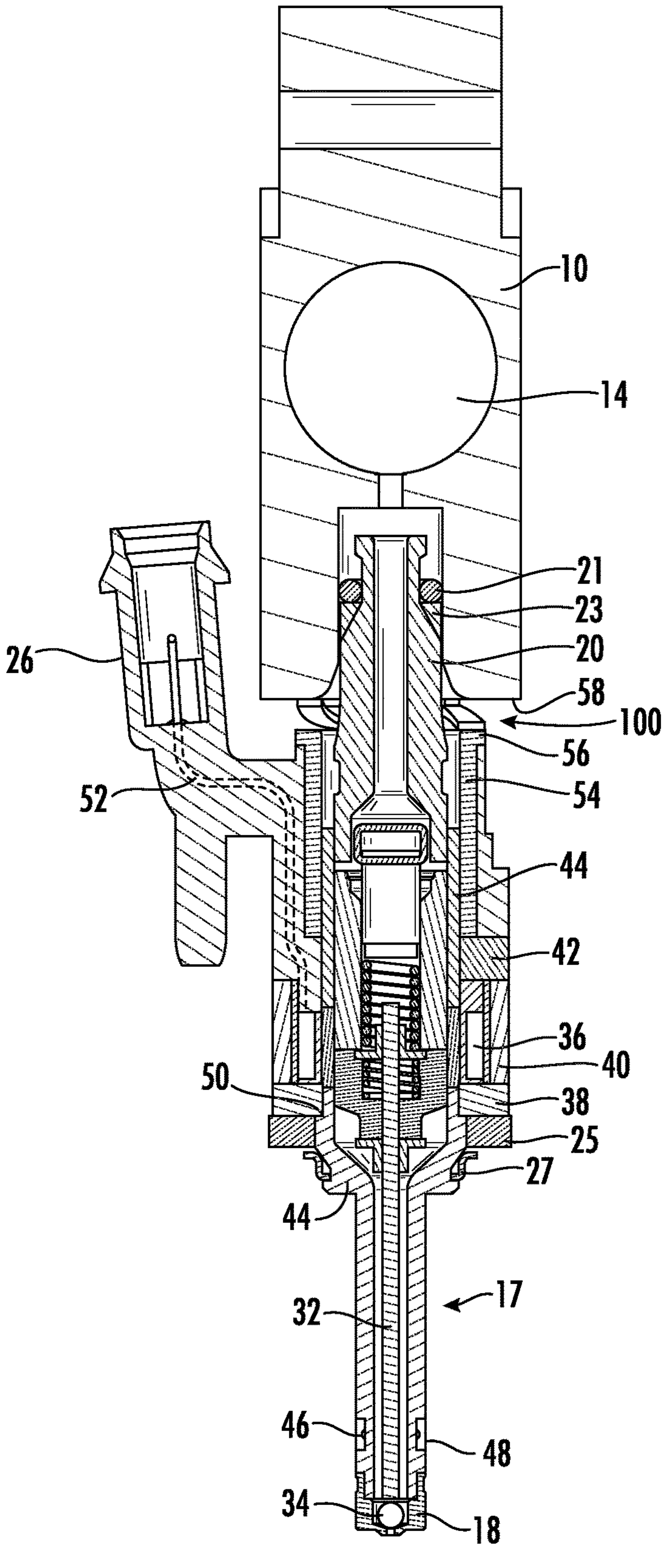
FIG. 5 is a sectional view through an outlet socket on the common rail and the fuel injector of FIG. 3, taken along line B-B of FIG. 3; intersecting the electrical connector for the injector solenoid valve.

FIGS. 4 and 5 are cross-sectional views through an embodiment of a fuel injector 12, showing portions of the common rail 10 and fuel injector 12 relevant to the disclosed load ring 100. The injector fuel tube assembly 24 includes an inlet 20 with an O-ring 21 and annular wedge-shaped back up washer forming a sealed connection received in an outlet 16 of the common rail 10. The O-ring 21 and back up wedge washer 23 that cooperate with the outlet 16 to maintain a sealed connection between the outlet 16 of the common rail 10 and the inlet 20 of each fuel injector 12. The connection between the common rail 10 and the inlet 20 of the injector 12 is capable of withstanding fuel pressures from 350 bar up to 1000 bar. From the sealed connection, the inlet 20 extends to an annular, open second end that is received within and welded to an open upper end of a valve body 44. As shown in FIGS. 4 and 5, the inlet 20 and valve body 44 overlap at a location above the magnetic pole and are welded together. The valve body 44 extends from its connection with the inlet 20 to an opposite end that includes the nozzle end 17 supporting the nozzle tip 18. A valve seat on the inside surface of the injector tip 18 cooperates with the valve member 34 connected at one end of the valve needle 32. When the valve member 34 is biased into contact with the valve seat, fuel in the fuel tube assembly 24 above the valve member 34 is prevented from passing through fuel injection orifices defined by the nozzle tip 18. When the valve member 34 is moved away from the valve seat, fuel passes between the valve seat and the valve member 34 and out the fuel injection orifices. A groove 46 on an outside surface of the nozzle end 17 above tip 18 supports a compression seal 48 which cooperates with the bore in the cylinder head (not shown) to contain pressurized gasses in the engine cylinder. It will be apparent that during the compression stroke and combustion stroke of the engine, the tip 18 and compression seal 48 of the injector 12 are exposed to significant pressure in a direction pushing the injector nozzle 17 out of the bore in the cylinder head.

The power group assembly 22 is assembled to the fuel tube assembly 24 as follows: The lower flux washer 38 and cylindrical housing 40 are placed over the valve body 44 with the lower flux washer 38 in contact with an annular shoulder 50 on the valve body 44. The lower flux washer 38 is welded to the valve body 44 and the cylindrical housing 40 is welded to the lower flux washer 38. The slotted upper flux washer 42 is inserted into the molded plastic coil assembly above the coil 36 with the slot in the upper flux washer aligned with the portion of the coil assembly that includes the conductors 52 extending between the coil 36 and the connector 26. The central opening in the upper flux washer 42 is aligned with the central opening in the coil 36 and in the molded plastic of the coil assembly extending above the coil 36 to the connector 26, and the assembled coil and upper flux washer are pressed over the valve body 44 of the fuel injector 12 to position the coil 36 within the annular space within the cylindrical body and beneath the upper flux washer 42 as shown in FIGS. 4 and 5. The upper flux washer 42 is welded to the cylindrical body 40 and the valve body 44 to complete the flux path radially outside the coil 36 and rigidly connect the upper flux washer 42 to the valve body 44. The upper flux washer 42 holds the coil 36 in place beneath it, while supporting the upper part of the coil assembly. Conductors 52 extend from the coil 36 axially through the slot defined by the upper flux washer 42 to the connector 26. This configuration securely retains the coil assembly 36, 26 to the fuel tube assembly 24. After these assembly steps are completed, the power group assembly 22 is retained in an assembled position on the fuel tube assembly 24 as shown in FIGS. 2, 4 and 5. The lower flux washer 38 is welded to the valve body 44 at the shoulder 50, the cylindrical housing 40 is welded to the lower flux washer 38 and the upper flux washer 42 is welded to the upper end of the cylindrical housing 40 to ensure that no air gaps interrupt the magnetic circuit.

As shown in FIGS. 4 and 5, according to aspects of the disclosure, an embodiment of a fuel injector 12 includes a burst ring 54 that surrounds the overlapping connection between the valve body 44 and the inlet 20. The burst ring 54 extends axially between a lower end in contact with an upper surface of the upper flux washer 42 and an upper end including a flange 56. The burst ring 54 is inserted radially between the valve body 44 and the molded plastic portion of the coil assembly 36, 26 above the upper flux washer 42. The overlapping connection between the inlet 20 and valve body 44 is axially between the lower end and upper end of the burst ring 54, so that the burst ring surrounds and supports the fuel tube assembly 24 at the overlapping connection of the inlet 20 and valve body 44. The flange 56 of the disclosed burst ring 54 projects radially outward and defines a load-bearing surface of the fuel injector 12, with a load path through the burst ring 54, upper flux washer 42, cylindrical body 40 and lower flux washer 38. A top surface of the radially projecting flange 56 acts as a load-receiving surface of the fuel injector 12. An annular bottom surface 58 of the common rail outlet 16 is arranged axially opposite the top surface of the flange 56. The top surface of the flange 56 and the bottom surface 58 of the common rail outlet 16 are radially spaced from the inlet 20. An embodiment of a disclosed load ring 100 is arranged between the bottom surface of each outlet and the top surface of the flange 56 of each injector 12 to bias the injectors 12 toward the combustion chamber of the respective engine cylinders.

FIG. 2 illustrates a fuel injector assembly incorporating a fuel injector 12, O-ring seal 21, backup washer 23, load ring 100, a spacer 25 and spacer retaining clip 25. The fuel injector assembly of FIG. 2 is delivered to engine manufacturers for assembly between an engine cylinder head and a common rail 10. The load ring 100 is retained on the inlet 20 by the O-ring seal 21 and the spacer 25 is retained to the injector body 44 by the retaining clip 27, so all components of the fuel injector assembly are present when the product is delivered for assembly. FIG. 2 illustrates an embodiment of a load ring 100 surrounding the inlet 20 and resting on top of the burst ring flange 56. FIGS. 4 and 5 illustrate the load ring 100 compressed between the bottom surface 58 of the common rail outlet 16 and the top surface of the burst ring flange 56.

Figure 7:
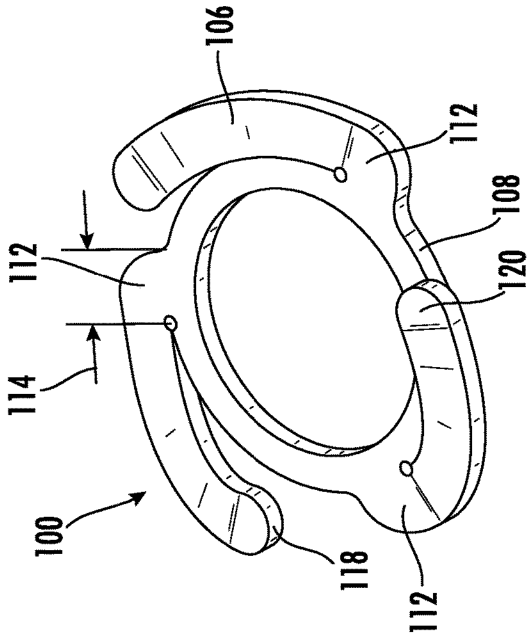
FIG. 7 is a top perspective view of the load ring of FIG. 5.
Figure 6:
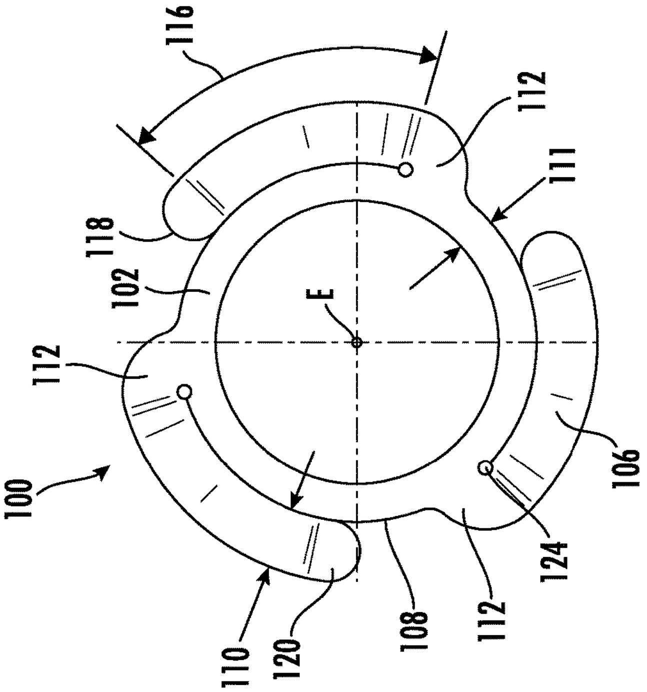
FIG. 6 is a top plan view of a load ring configured according to aspects of the disclosure.
Figure 8:
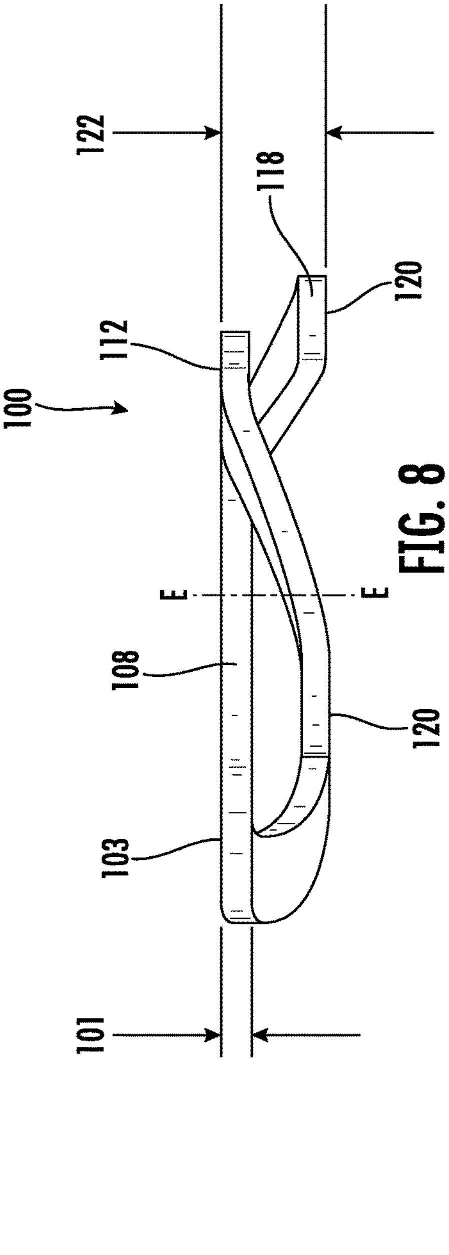
FIG. 8 is a side plan view of the load ring of FIGS. 5 and 6.

FIGS. 6-8 illustrate an embodiment of a load ring 100 according to aspects of the disclosure. The load ring 100 may be constructed of resilient steel having a thickness 101 of between 0.5 mm and 0.8 mm. The resilient steel may be spring steel or stainless steel. The load ring 100 includes an annular body 102 that includes upper surface 103. The load ring 100 is configured to be reversible and function with surface 103 facing the outlet 16 or the fuel injector 12. The load ring 100 includes an odd numbered plurality of resilient arms 106 connected at a circular outer periphery 108 of the annular body 102. The disclosed load ring 100 includes three resilient arms 106. Each arm 106 has a radial width 110 greater than a radial width 111 of the annular body 102. In a preferred embodiment the radial width 111 of the annular body 102 is between 0.5 and 0.8 times the radial width 110 of the arms 106. Each arm 106 has an integral connection 112 to the annular body 102 that extends along a circumference of the outer periphery 108 of the load ring 100 a distance 114 approximately equal to the radial width 110 of the arm 106. An outside contour of each connection 112 may be a portion of a circle having a radius projecting from the junction of the inside edge of the arm 106 and the outer periphery 108 of the annular body 102, where the radius has a length equal to the width 110 of the arm 106. According to aspects of the disclosure, the annular body 102 of the load ring 100 connects and supports the arms 106. The annular body 102 has an inside diameter selected to ensure the load ring is centered on the inlet 20 of the fuel injector 12 as shown in FIG. 2. The resilient arms 106 have a curvature concentric with the annular body 102 of the load ring 100.

The integral connection 112 of each arm 106 to the annular body 102 is co-planar with the annular body 102 and projects radially from the outer periphery 108 of the annular body 102 a distance equal to the radial width 110 of the arms 106. Each arm 106 extends about the outer periphery 108 of the annular body 102 an equal arcuate distance 116 from the connection 112 to a tip 118. The arcuate length of each arm 106 spans a majority of the outer periphery 108 of the annular body 102 between the connections 112 and the arms 106 project in the same circumferential direction about the outer periphery 108 of the annular body 102. In the disclosed embodiment of a load ring 100, the arcuate length of the arms 106 is between 65° and 90°, but the arcuate length of the arms 106 can be adjusted as needed to greater or less than this range. The length of the arms 106 allow the arms to distribute the deflection (movement) of the arms over the length of the arms 106 and reduce stress concentrations. The configuration of the load ring 100 allows each arm 106 to be deflected an axial distance of between about 0.3 mm and 0.6 mm at a load of approximately 60 Newtons with a relatively low combined stress where each arm 106 extends from the connection 112. In the disclosed embodiment of a load ring 100, the tip 118 of each arm 106 is rounded includes an end portion 120 formed to be approximately parallel with a plane of the annular body 102 when the load ring is at its free height, or in an unloaded condition. The end portion 120 of each arm 106 is an equal radial distance from a central axis E-E of the load ring and at the same radial distance from the central axis E-E as the connections 112. The end portion 20 of each arm is also at an equal circumferential distance about a circumference of the load ring 100 from the connection 112.

As shown in 2, 4 and 5, the disclosed load ring 100 is axially compressed between a surface 58 of an outlet 16 of a common rail 10 and a load-receiving surface on the fuel injector 12. In the disclosed fuel injector 12, the load-receiving surface is a top surface of a flange 56 on the burst ring 54. The load ring 100 contacts the opposed surfaces of the outlet 16 and fuel injector 12 at opposite facing surfaces of the connections 112 and end portions 120, so that the load ring 100 resilient bias acts on the fuel injector 12 and on the outlet 16 at three positions equally arranged about the outer periphery 108 of the annular body 102. Using an odd numbered plurality of arms 106, connections 112 and contact portions 120 ensures that bias force from the load ring 100 is axisymmetric about an axis E-E of the load ring and minimizes off-axis (lateral) forces on the fuel injector 12 when in use. As best shown in FIGS. 2, 7 and 8, each arm 106 has a compound “S” shaped curvature along its length, and has a convex surface where the arm 106 approaches the side of the end portion 120 and connection 112 where the load ring 100 bears on the respective surface 58, 56. Between the connection 112 and the end portion 120, each arm 106 is deflected away from the annular body 102 to axially separate the end portion 120 from the connections 112 by a free height 122 of between 2 mm and 4 mm, although the free height will differ for alternative configurations of the load ring 100. In a disclosed embodiment, an inner edge of each arm 106 includes a relief opening 124 at the junction of the inner edge of the arm 106 and the outer periphery 108 of the annular body 102. The relief opening 124 relieves stress that may accumulate at the junction of the inner edge of the arm 106 and the annular body 102 as the load ring 100 is exposed to cyclic forces during engine operation.

When axially compressed between the bottom surface 58 of the common rail 10 and the top surface of the burst ring flange 56, the disclosed load ring 100 produces forces that are evenly distributed about an axis of the injector 12, biasing the injector 12 toward the combustion chamber of the engine. The odd numbered plurality of arms 106 produce forces on the injector 12 that resist pivoting of the injector 112 relative to the cylinder head of the engine.

What is claimed:

1. A fuel injector assembly comprising:

an inlet with a first end defining an opening for receiving fuel from a common rail and a second end having a cylindrical outside surface, said opening extending through the second end of the inlet;

a valve body with an open first end having a cylindrical side wall including an inside surface receiving the second end of the inlet and an outside surface, the inlet second end axially overlapping with the cylindrical side wall of the valve body to form a joint, said valve body including a nozzle end opposite said first end;

a burst ring having a cylindrical body with an inside surface surrounding said joint between the inlet and the valve body, a first end of the cylindrical body seated against a radially projecting shoulder rigidly connected to the valve body and a second end of the burst ring defining a load-receiving surface facing the inlet first end, the joint between the inlet and valve body positioned axially between the first and second ends of the cylindrical body of the burst ring, wherein the burst ring inside surface is in contact with said valve body outside surface at an axial position surrounding the joint between the inlet and valve body, said burst ring providing support to the joint against outward forces generated by pressurized fuel within the connected inlet and valve body.

2. The fuel injector assembly of claim 1, comprising a load ring having an annular body with a first inside diameter surrounding the cylindrical outside surface of the inlet, and an O-ring seated in an annular groove on a side surface of said inlet, said O-ring having an outside diameter greater than the first inside diameter of said load ring, wherein said load ring cannot pass over the first end of said inlet when said O-ring is seated in said annular groove.

3. The fuel injector of claim 1, comprising an annular spacer surrounding said valve body between said open first end and said nozzle end, and a retaining clip having a radially projecting flange facing said annular spacer and a plurality of inward oriented fingers engaged in a groove on said valve body, said retaining clip retaining said annular spacer on said valve body.

4. The fuel injector assembly of claim 1, comprising:

a annular coil embedded in molded plastic, said annular coil surrounding the valve body at an axial position between the radially projecting shoulder and the nozzle end, said molded plastic including a connector body and an annular portion surrounding said burst ring, said molded plastic surrounding conductors extending between the coil and the connector body, wherein said burst ring includes a radially projecting flange extending radially over an upper end of said annular portion, an upper surface of said flange defining said load receiving surface.

5. The fuel injector assembly of claim 4, comprising:

an annular flux washer surrounding the valve body between the coil and the nozzle end;

a slotted flux washer partially surrounding the valve body between the coil and the inlet; and a cylindrical housing extending axially between the annular flux washer and the slotted flux washer, wherein said annular flux washer, cylindrical housing and slotted flux washer form part of a magnetic circuit directing magnetic flux generated by the coil when electrical energy is applied to the coil by a control circuit connected to the connector body and conductors.

6. The fuel injector assembly of claim 5, wherein the annular flux washer rests on a shoulder radially projecting from the valve body and is welded to the valve body, the cylindrical housing is in contact with and welded to both the annular flux washer and the slotted flux washer, wherein an upper surface of the upper flux washer defines the radially projecting shoulder rigidly connected to the valve body against which the first end of the burst ring is seated.

7. The fuel injector assembly of claim 5, wherein the conductors extend from the coil to the connector body through a slot defined by the slotted flux washer.

8. A fuel delivery assembly comprising:

a common rail comprising a reservoir for containing pressurized fuel and including a plurality of outlets for delivery of pressurized fuel from the reservoir to a plurality of fuel injectors, said common rail supported in a fixed position relative to a cylinder head of an internal combustion engine;

a plurality of fuel injector assemblies of claim 1, said valve body having a forward end axially between the nozzle end and the radially projecting shoulder, said forward end supported on the cylinder head with the nozzle end projecting through the cylinder head into a combustion chamber partially defined by the cylinder head; and a load ring arranged between each outlet and the load receiving surface of each fuel injector assembly, said load ring comprising:

an annular body having a first surface facing either the outlet of the common rail or the load-receiving surface of each fuel injector assembly, an plurality of resilient arms connected to the annular body, each resilient arm including a connection projecting radially from the annular body and a resilient portion extending from the connection to a free end, each said resilient arm extending along the circumference of the annular body, the free end of each resilient arm including an end portion having a contact surface facing axially opposite the first surface of the annular body, the contact surface of each resilient arm being axially offset from the first surface of the annular body, wherein said load ring is compressed between the outlet and the load-receiving surface of the fuel injector assembly to bias the forward end of each fuel injector assembly toward the cylinder head, the load ring generating a bias force that is symmetrical with a longitudinal axis of the fuel injector assembly.

9. The fuel delivery assembly of claim 8, comprising:

an annular spacer surrounding said valve body axially between said forward end and said nozzle end, said annular spacer resting on the cylinder head and defining an axial position of the nozzle end with respect to the combustion chamber; and a retaining clip having a radially projecting flange facing said annular spacer and a plurality of inward oriented fingers engaged in a groove on said valve body, said retaining clip retaining said annular spacer on said valve body.

* * * * *